(12) United States Patent
Ito et al.

(10) Patent No.: US 8,707,377 B2
(45) Date of Patent: Apr. 22, 2014

(54) PROGRAM SENDING CONTROLLING APPARATUS, PROGRAM SENDING CONTROLLING METHOD AND PROGRAM

(75) Inventors: Takafumi Ito, Kanagawa (JP); Naomi Egashira, Kanagawa (JP); Tomoyuki Yamamoto, Kanagawa (JP); Kazunori Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 13/076,096

(22) Filed: Mar. 30, 2011

(65) Prior Publication Data

US 2011/0249955 A1    Oct. 13, 2011

(30) Foreign Application Priority Data

Apr. 7, 2010  (JP) ................ P2010-089030

(51) Int. Cl.
*H04N 7/18* (2006.01)
*H04N 7/10* (2006.01)
*H04N 7/025* (2006.01)

(52) U.S. Cl.
USPC ............... 725/115; 725/32; 725/36

(58) Field of Classification Search
USPC ............................ 725/115, 32, 36
See application file for complete search history.

(56) References Cited

U.S. PATENT DOCUMENTS

| | | | | |
|---|---|---|---|---|
| 6,952,221 | B1 * | 10/2005 | Holtz et al. | 715/723 |
| 7,349,663 | B1 * | 3/2008 | Joseph | 455/3.02 |
| 8,010,952 | B2 * | 8/2011 | Datla et al. | 717/143 |
| 2007/0039018 | A1 * | 2/2007 | Saslow et al. | 725/22 |

FOREIGN PATENT DOCUMENTS

| | | |
|---|---|---|
| JP | 10 190596 | 7/1998 |
| JP | 10 229508 | 8/1998 |
| JP | 2005 101701 | 4/2005 |

* cited by examiner

*Primary Examiner* — Brian T Pendleton
*Assistant Examiner* — Alexander Gee
(74) *Attorney, Agent, or Firm* — Sony Corporation

(57) ABSTRACT

Disclosed herein is a program sending controlling apparatus, including: a retaining section adapted to retain a playlist in which cues which are progressing units of a program are disposed in a time series; an apparatus controlling section adapted to control on-air of a broadcasting-related apparatus based on the playlist; an editing section adapted to edit the playlist; a detection section adapted to detect, in response to editing carried out for the playlist corresponding to the program, presence or absence of a syntax error in the playlist; and a display controlling section adapted to cause the playlist corresponding to the program to be displayed and cause, when the syntax error is detected, an error indication to be displayed at a position of that one of the cues of the displayed playlist which corresponds to the detected syntax error.

18 Claims, 7 Drawing Sheets

PROGRAM SENDING CONTROLLING APPARATUS, PROGRAM SENDING CONTROLLING METHOD AND PROGRAM

BACKGROUND OF THE INVENTION

1. Field of the Invention

This invention relates to a program sending controlling apparatus, a program sending controlling method and a program, and more particularly to a program sending controlling apparatus, a program sending controlling method and a program suitable for use with a case where the contents of a program are progressed in accordance with a produced playlist.

2. Description of the Related Art

In the past, a program sending controlling apparatus is utilized in a broadcasting station and so forth. This program sending controlling apparatus successively progresses an item of a program configuration in accordance with a produced playlist also called cue sheet. Here, one program is configured from one or more events, and one event is configured from one or more cues or items.

For example, a news program is configured from such events as an opening roll, a greeting, a top news, politics, economics, sports and a weather forecast in the order of a time series. For example, the sports which is one of events is formed from three cues including an item in which a caster talks results of games, another item in which recorded images are displayed and a further item in which a manner in which a reporter on the spot is interviewing is displayed.

In each cue, various broadcasting-related apparatus such as a camera, a video server and a VTR are controlled in accordance with the playlist to implement sending of program contents in accordance with the playlist. Here, if an apparatus used suffers from some trouble, then this is notified to an operator such as, for example, a technical director of the broadcasting station.

For example, Japanese Patent Laid-Open No. Hei 10-190596 discloses a technique that a failure or the like of a broadcasting-related apparatus is detected and change of allocation of apparatus is carried out. Meanwhile, Japanese Patent Laid-Open NO. 2005-101701 discloses another technique that, when an apparatus which sends a broadcasting material detects a failure of an audio channel, a warning screen image is displayed. Further, Japanese Patent Laid-Open No. Hei 10-229508 discloses a further technique of an error monitor system wherein an error is detected from information sent from a broadcasting-related apparatus and an error indication is carried out by change of icon display or using a status bar.

SUMMARY OF THE INVENTION

With the existing techniques described above, it is possible to detect an error of a broadcasting-related apparatus used in each cue of a playlist and notify an operator of occurrence of the error.

However, in utilization of a certain broadcasting-related apparatus, although there is no problem if attention is paid to one cue, some problem sometimes occurs if attention is paid to successive cues. For example, it is assumed that a playlist is produced which tries to cause a camera, which has picked up an image in a first direction till an end of a certain cue, to pick up an image in a second direction different from the first direction from the top of a next cue. In this instance, an image during change of the direction of the camera is adopted at the top of the next cue, and the image of the program becomes unbecoming.

In the past, with regard to such a problem as just described, an operator is obliged to look at a playlist to decide whether or not there is some failure. If the playlist is changed during on-air of a news program in live broadcasting, then it is very difficult to use the human power to decide whether or not there happens a problem.

Therefore, it is desirable to provide a program sending controlling apparatus, a program sending controlling method and a program which can detect presence or absence of occurrence of a problem in advance when broadcasting-related apparatus are controlled in accordance with a playlist and notify an operator of a result of the detection.

According to an embodiment of the present invention, there is provided a program sending controlling apparatus, including retaining means for retaining a playlist in which cues are progressing units of a program are disposed in a time series, apparatus controlling means for controlling on-air of a broadcasting-related apparatus based on the playlist, editing means for editing the playlist, detection means for detecting, in response to editing carried out for the playlist corresponding to the program, presence or absence of a syntax error in the playlist, and display controlling means for causing the playlist corresponding to the program to be displayed and causing, when the syntax error is detected, an error indication to be displayed at a position of that one of the cues of the displayed playlist which corresponds to the detected syntax error.

The detection means may detect, in response to editing carried out for the playlist corresponding to the program, at least the syntax error in the sole cue in the playlist or the syntax error between successive ones of the cues.

In this instance, the editing for the playlist corresponding to the program may include at least one of addition, deletion, replacement and updating of the cue.

Or, the detection means may detect, as the syntax error between the successive cues, that the same broadcasting-related apparatus is used in the successive cues.

Or else, the detection means may detect, as the syntax error between the successive cues, that the same output channel of the same broadcasting-related apparatus is used in the successive cues.

Otherwise, the detection means may detect, as the syntax error in the sole cue, that a period of time of the cue is shorter than a transition time period required for transition to a next cue.

Or otherwise, the detection means may detect presence or absence of a syntax error with regard to the entire playlist in response to the editing carried out for the playlist corresponding to the program.

The program sending controlling apparatus may further include detection means for detecting an error occurring with the broadcasting-related apparatus, the display controlling means causing an error indication corresponding to the detected syntax error and an error indication corresponding to the detected error occurring with the broadcasting-related apparatus to be displayed in a distinguishable manner from each other at a corresponding position of the cue of the playlist.

According to another embodiment of the present invention, there is provided a program sending controlling method for a program sending controlling apparatus which includes retaining means for retaining a playlist in which cues which are progressing units of a program are disposed in a time series, apparatus controlling means for controlling on-air of a broadcasting-related apparatus based on the playlist, and editing means for editing the playlist, the program sending controlling method, including the steps of: detecting, in response to editing carried out for the playlist corresponding to the program, presence or absence of a syntax error in the playlist, and causing the playlist corresponding to the program to be displayed and causing, when the syntax error is detected, an error indication to be displayed at a position of that one of the cues of the displayed playlist which corresponds to the detected syntax error.

According to a further embodiment of the present invention, there is provided a program for causing a computer to function as retaining means for retaining a playlist in which cues which are progressing units of a program are disposed in a time series, apparatus controlling means for controlling on-air of a broadcasting-related apparatus based on the playlist, editing means for editing the playlist, detection means for detecting, in response to editing carried out for the playlist corresponding to the program, presence or absence of a syntax error in the playlist, and display controlling means for causing the playlist corresponding to the program to be displayed and causing, when the syntax error is detected, an error indication to be displayed at a position of that one of the cues of the displayed playlist which corresponds to the detected syntax error.

In the program sending controlling apparatus, program sending controlling method and program, in response to editing carried out for a playlist corresponding to a program, presence or absence of a syntax error in the playlist is detected. Then, the playlist corresponding to the program is displayed, and when the syntax error is detected, an error indication is displayed at a position of that one of the cues of the displayed playlist which corresponds to the detected syntax error.

With the program sending controlling apparatus, program sending controlling method and program, presence or absence of occurrence of a problem in the case where a broadcasting-related apparatus is controlled in accordance with a playlist can be detected in advance and notified to an operator.

DETAILED DESCRIPTION OF THE PREFERRED EMBODIMENT

In the following, a preferred embodiment of the present invention is described.

1. Example of the Configuration of the Embodiment

Example of the Configuration of the Program Sending Controlling Apparatus

Figure 1:
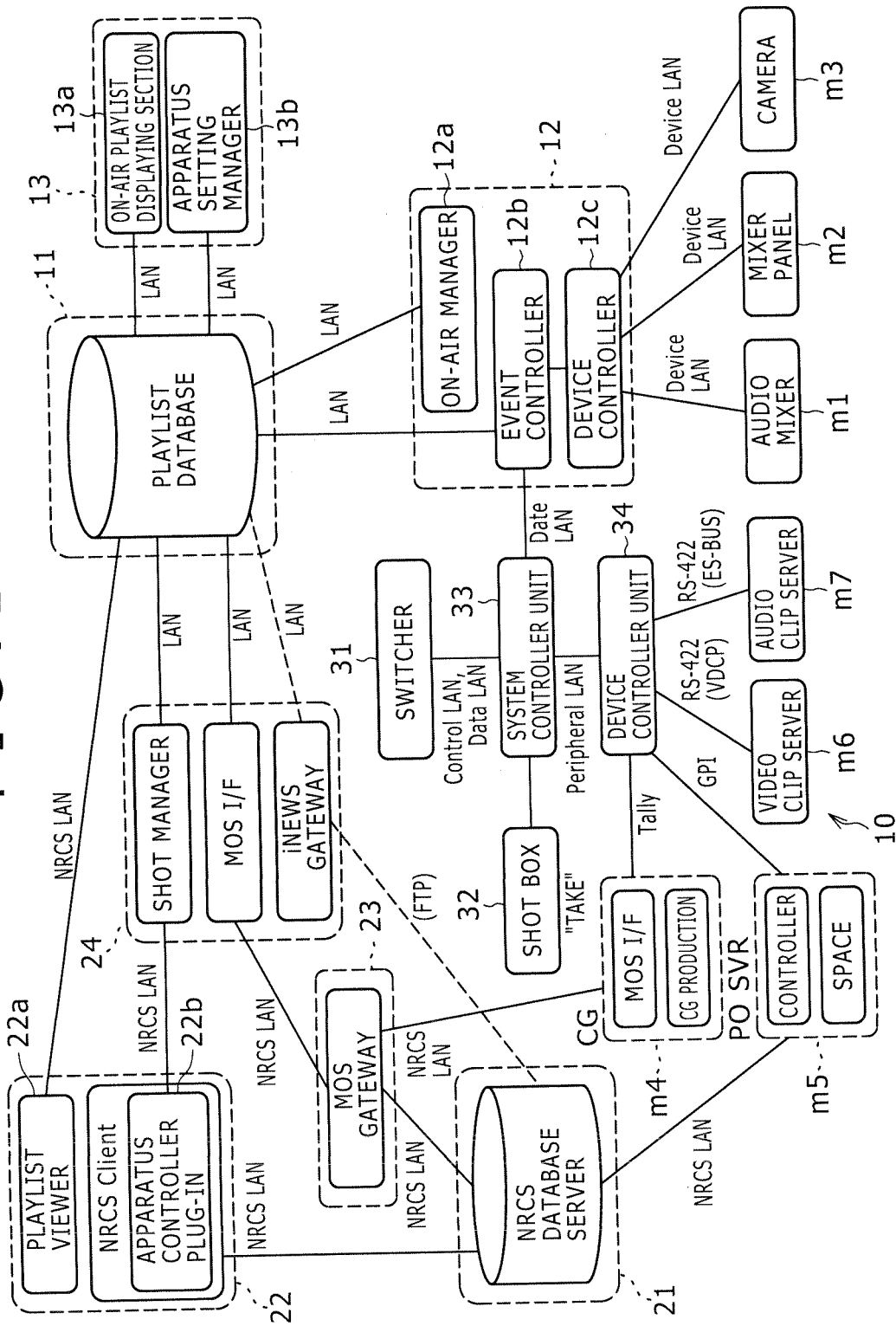
FIG. 1 is a block diagram showing an example of a configuration of a program sending controlling apparatus to which an embodiment of the present invention is applied.

FIG. 1 shows an example of a configuration of a program sending controlling apparatus 10 according to an embodiment of the present invention.

Referring to FIG. 1, the program sending controlling apparatus 10 includes a playlist database 11, an apparatus controller 12 and a playlist displaying section 13 as principal components thereof.

The playlist database 11 stores playlists and related information. The apparatus controller 12 controls broadcasting-related apparatus based on a playlist. The playlist displaying section 13 causes a playlist to be displayed on the screen of a monitor.

The program sending controlling apparatus 10 further includes an NRCS (News Room Computer System) database server 21, an NRCS client 22, a MOS gateway 23, and a switcher 31. Or, the program sending controlling apparatus 10 is configured such that it operates in liaison with the apparatus mentioned. It is to be noted that each broken line framework indicates an element which can be configured from a computer.

The playlist, also called cue sheet, is information indicative of a progress schedule of a program, and each program is formed from one or more events each formed from one or more cues. The contents of the cues are used for control in an order in which the cues are arrayed in the playlist. Each cue is placed into an on-air state in response to an instruction, that is, a TAKE instruction, after it is placed into a standby state, in which it is to be executed subsequently. Further, the term program is used to represent not only a television program but also a content which includes images and sound and is distributed or downloaded, for example, through the Internet.

The broadcasting-related apparatus may include an audio mixer m1, a mixer panel m2, a camera m3 and so forth connected to the apparatus controller 12 side. Further, the broadcasting-related apparatus may include a CG (Character Generator) outputting section m4 and a playout server m5 each connected to an NRCS network or NRCS LAN (Local Area Network), and a video clip server m6 and an audio clip server m7 connected to the switcher 31 side. It is to be noted that such broadcasting-related apparatus as mentioned above are mere examples, and various apparatus which store, output or produce various broadcasting materials are connected.

The playlist database 11 is connected to the apparatus controller 12, playlist displaying section 13 and NRCS client 22 through a network such as a LAN. Consequently, the apparatus controller 12, playlist displaying section 13 and NRCS client 22 input and output a playlist stored in the playlist database 11 through the network. Further, the playlist database 11 is connected to the NRCS database server 21 by a network through an interface section 24 and the MOS gateway 23. Consequently, liaison regarding a database is established between the playlist database 11 and the NRCS database server 21.

The apparatus controller 12 includes an on-air manager 12a, an event controller 12b and a device controller 12c.

The on-air manager 12a carries out on-air management. In particular, the on-air manager 12a carries out a starting process or the like of the apparatus controller 12 in response to a starting operation or an ending operation of a playlist to carry out a standby or ending process of the playlist.

The event controller 12*b* successively determines events which configure a playlist as a processing object and executes cues which configure the event of the processing object. In particular, the event controller 12*b* issues an instruction to the device controller 12*c* to carry out operation of the broadcasting-related apparatus necessary for standby or preparations for a next cue based on the playlist stored in the playlist database 11.

Further, the event controller 12*b* issues an instruction to the device controller 12*c* to carry out a series of operations to the broadcasting-related apparatus when a cue is placed into an on-air (TAKE) state. In particular, the event controller 12*b* receives a TAKE command issued by an operator, who may be a technical director of a broadcasting station or the like, using the shot box 32 on the switcher 31 side and sends an on-air timing to the device controller 12*c*. In this instance, the event controller 12*b* transmits the on-air timing to the device controller 12*c* by production and transmission of a symbolic command/time line.

Further, the event controller 12*b* stores a status of the apparatus into the playlist database 11. Here, if some trouble occurs with one of the broadcasting-related apparatus m1 to m7, then error information is sent out from the relevant broadcasting-related apparatus. The event controller 12*b* receives the error information sent out from the broadcasting-related apparatus and adds or associates the error information to or with a cue of the playlist which utilizes the broadcasting-related apparatus from which the error information is sent out from within the playlist stored in the playlist database 11. Under certain circumstances, operation same as that carried out when error information is received is carried out not in response to reception of error information from the broadcasting-related apparatus but in response to failure in communication with the broadcasting-related apparatus.

The device controller 12*c* controls the broadcasting-related apparatus.

The playlist displaying section 13 has an on-air playlist displaying section 13*a* and an apparatus setting manager 13*b*. The on-air playlist displaying section 13*a* carries out control of reading out a playlist during on-air from the playlist database 11 and displaying the playlist on the screen of the monitor.

The apparatus setting manager 13*b* is a module which carries out registration of settings to the broadcasting-related apparatus. The apparatus setting manager 13*b* sets a series of operations for the broadcasting-related apparatus collectively as a software button such that it is allocated to a cue of the playlist.

If error information of the broadcasting-related apparatus is added to a displayed playlist when the playlist during on-air is displayed on the screen of the monitor of the on-air playlist displaying section 13*a*, then error indication is carried out at the position of the cue of the playlist which corresponds to the error information.

Further, the on-air playlist displaying section 13*a* supervises presence or absence of real time editing for the displayed playlist during on-air, and if editing is carried out, then the on-air playlist displaying section 13*a* decides presence or absence of a syntax error of the playlist. Then, if a syntax error exists, then the on-air playlist displaying section 13*a* carries out error indication at the position of the cue of the playlist which corresponds to the detected syntax error. It is to be noted that details of a syntax error in a playlist are hereinafter described.

Further, the on-air playlist displaying section 13*a* carries out control of displaying, when it accepts that the cue with regard to which the error indication of the playlist displayed on the screen is carried out, detailed contents of the error information corresponding to the selected cue on the screen thereof.

The on-air playlist displaying section 13*a* carries out updating of the playlist being displayed at a predetermined timing. In particular, the status of the broadcasting-related apparatus is sent to the event controller 12*b*, and the event controller 12*b* carries out information updating of the playlist. Therefore, the on-air playlist displaying section 13*a* carries out updating of the playlist in order that the latest information may be reflected.

For example, the on-air playlist displaying section 13*a* updates the error information added to the playlist being displayed at a timing at which the cue of the broadcasting object of the playlist being displayed on the screen progresses. Further, the on-air playlist displaying section 13*a* updates the information of the playlist at intervals of time set in advance, updates the information when an updating instruction is received from the operator or when a message representing that some change is applied to the playlist during on-air is received.

The NRCS client 22 is connected to the playlist database 11 and the NRCS database server 21 through an NRCS network of the MOS protocol. The MOS protocol is principally for remotely controlling a video type server placed in a news room from the NRCS, and a uniquely extended tag is permitted on the XML (Extensible Markup Language) base.

A playlist viewer 22*a* and an apparatus controller plug-in 22*b* are installed in the NRCS client 22. Meanwhile, the playout server m5 is connected to the NRCS database server 21 through an NRCS network of the MOS protocol.

The playlist viewer 22*a* newly produces a playlist or edits a produced playlist in response to an operation of an operator such as a producer of a program. In particular, the playlist viewer 22*a* has functions similar to those of the playlist displaying section 13 and provides the functions to the operator of the NRCS client 22. The description described as a function of the playlist displaying section 13 herein represents a function provided similarly also from the playlist viewer 22*a*, and the playlist viewer 22*a* can use not only a playlist during on-air but also a playlist in the playlist database 11 as an object.

Incidentally, a playlist which corresponds to a program whose configuration may be changed at all times like a news program which is broadcast on the real time basis is edited at all times even during on-air. Here, the editing includes addition, deletion, replacement, order change and updating of a cue or cues which configure the playlist.

The playout server m5 is a video server in which materials replaced day by day are stored and is used for an editing application. Therefore, a high function is required for the playout server m5.

Meanwhile, the NRCS database server 21 is connected to the interface section 24 through the MOS gateway 23 and is connected to the playlist database 11 through the interface section 24. The MOS gateway 23 is a gateway which connects broadcasting-related apparatus complying with the MOS protocol such as the CG outputting section m4 and NRCS database server 21 to the network.

The interface section 24 is used to connect the blocks on the NRCS side and the apparatus on the apparatus controller 12 side to each other. In other words, the interface section 24 connects the MOS protocol on the NRCS side and the network on the apparatus controller 12 side such as a LAN to establish liaison between them.

The switcher 31 is connected to a system control unit 33 and connected to a device control unit 34 and the shot box 32 through the system control unit 33. The switcher 31 handles a system of an image signal not shown such as an SDI (Serial Digital Interface) transmission system and receives a large number of image inputs. Then, the switcher 31 carries out changeover, synthesis, special effect application or the like to the received image inputs and outputs various image outputs. The switcher 31 is also called effect switcher.

Further, the switcher 31 is controlled from the system control unit 33. It is to be noted that, under certain circumstances, an operation inputting section for manually operating the switcher 31 may be provided additionally such that it is directly connected to the switcher 31 or is connected to the system control unit 33. Image signals from the broadcasting-related apparatus which have an image output such as the video clip server m6 and the playout server m5 are inputted to the switcher 31, and outputs of the switcher 31 are sent to the monitor or sent out as images of a program to a succeeding stage.

The system control unit 33 sends an instruction to the switcher 31, sends an instruction to the broadcasting-related apparatus through the device control unit 34 or issues a notification to the event controller 12b in response to an instruction of switching sent thereto from the shot box 32. Further, the system control unit 33 repeats communication between the event controller 12b and a connection destination of the event controller 12b.

The shot box 32 is a console on which a plurality of switches are provided. The operator would select a switch of a shot box at a predetermined timing to carry out switching of the broadcasting-related apparatus. The device control unit 34 includes various communication interfaces and carries out interface with various apparatus.

The video clip server m6 and the audio clip server m7 are connected to the device control unit 34 through a serial communication line such as an RS-422 line. Further, the device control unit 34 is connected to the MOS apparatus on the NRCS side through a parallel interface such that the MOS apparatus can be notified of a timing of an instruction from the shot box 32 or the event controller 12b. It is to be noted that, since those apparatus are used for on-air utilization, that is, for broadcasting utilization, except some apparatus for exclusive use for controlling, they receive a video synchronizing signal or reference signal, for example, from a reference signal of a broadcasting station and carry out video processing all in synchronism with each other.

Example of Apparatus Setting Operation

Figure 2:
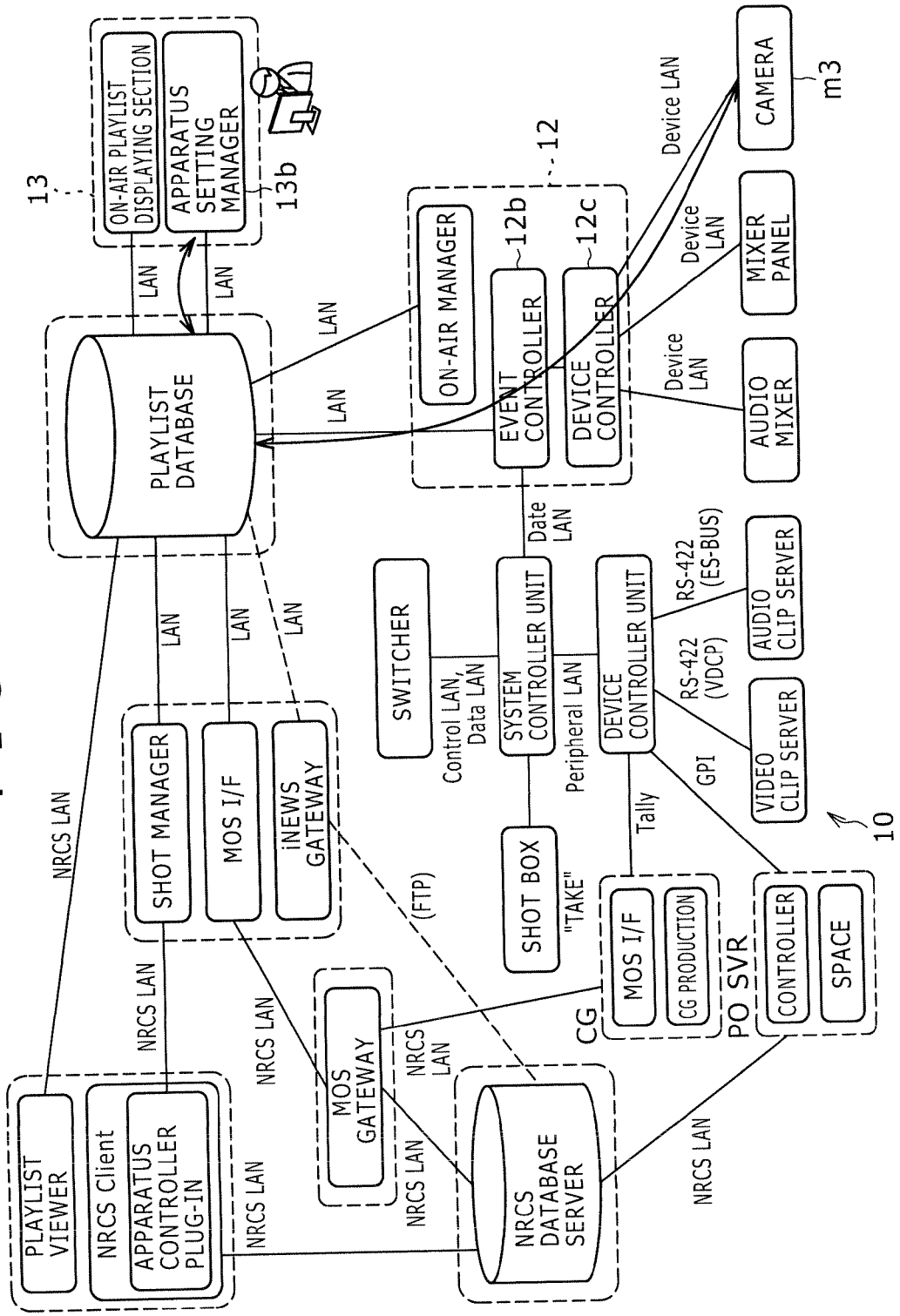
FIG. 2 is a similar view but illustrating an example of setting operation for different apparatus of the program sending controlling apparatus of FIG. 1 by an apparatus setting manager.

FIG. 2 illustrates an example of setting operation of the broadcasting-related apparatus by the apparatus setting manager 13b.

The apparatus setting manager 13b carries out registration of settings of functions and operations regarding the broadcasting-related apparatus.

The operator would start the apparatus setting manager 13b on the playlist displaying section 13. The started apparatus setting manager 13b searches the playlist database 11 when it receives a setting starting instruction of a desired broadcasting-related apparatus, for example, the camera m3, from the operator. Here, if settings of the relevant broadcasting-related apparatus are registered already, then the setting information is read out and displayed on the screen.

If settings of the relevant broadcasting-related apparatus are not registered as yet, then the apparatus setting manager 13b fetches information of the relevant broadcasting-related apparatus into the playlist database 11. In particular, the apparatus setting manager 13b issues a request for transmission of information of the relevant broadcasting-related apparatus to the event controller 12b of the apparatus controller 12. The event controller 12b sends the request to the relevant broadcasting-related apparatus through the device controller 12c and returns a response from the relevant broadcasting-related apparatus to the playlist database 11. The apparatus setting manager 13b fetches the information of the relevant broadcasting apparatus transmitted from the event controller 12b to the playlist database 11 and displays the information on the screen.

If the operator refers to the display of the screen and sets desired functions or operations and then issues a registration operation instruction, then the apparatus setting manager 13b produces a software button which integrates the set functions and operations and registers the software button into the playlist database 11.

Example of Playlist Production Operation

Figure 3:
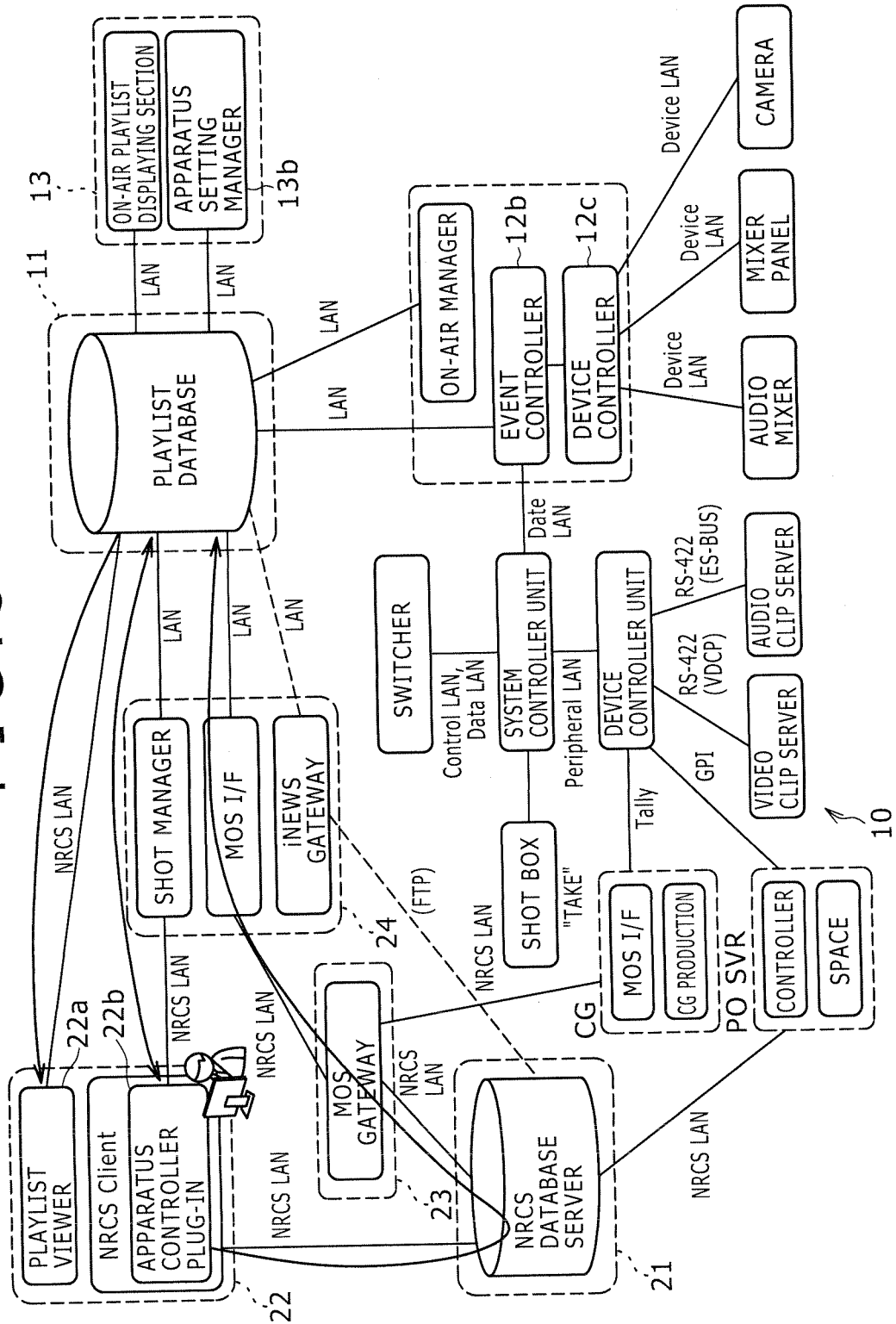
FIG. 3 is a similar view but illustrating an example of playlist production operation of the program sending controlling apparatus of FIG. 1.

FIG. 3 illustrates an example of playlist production operation. It is to be noted that, while an example wherein a playlist is produced by the playlist viewer 22a of the NRCS client 22 is described with reference to FIG. 3, also it is possible for the playlist displaying section 13 to produce a playlist.

First, the NRCS client 22 starts up the playlist viewer 22a in response to an operation from an operator such as a producer of the program and reads out information of playlists from the playlist database 11. Thereupon, if a playlist is to be produced newly, then sample data stored in the playlist database 11 is read out. On the other hand, if a playlist registered already is to be edited, then data of the playlist of the object is read out.

The playlist viewer 22a displays the playlists read out from the playlist database 11 on the screen. Thereafter, the NRCS client 22 refers to the playlist displayed on the screen in response to an operation of the operator to construct or edit cues of the playlist.

In particular, if the operator issues an instruction to construct or edit the playlist, then construction or editing of cues in the NRCS database server 21 included in the instruction is executed by the apparatus controller plug-in 22b of the NRCS client 22 in an associated relationship with the cues. If the operator issues an instruction to register the playlist after the construction or editing, then the apparatus controller plug-in 22b transfers the playlist after the construction or editing to the playlist database 11 through the network so as to be registered into the playlist database 11.

The cues of the playlist registered in the playlist database 11 are associated with the cues in the NRCS database server 21, and upon execution, they are synchronized with each other through the MOS gateway 23 and the interface section 24.

Example of Program Sending Operation

Figure 4:
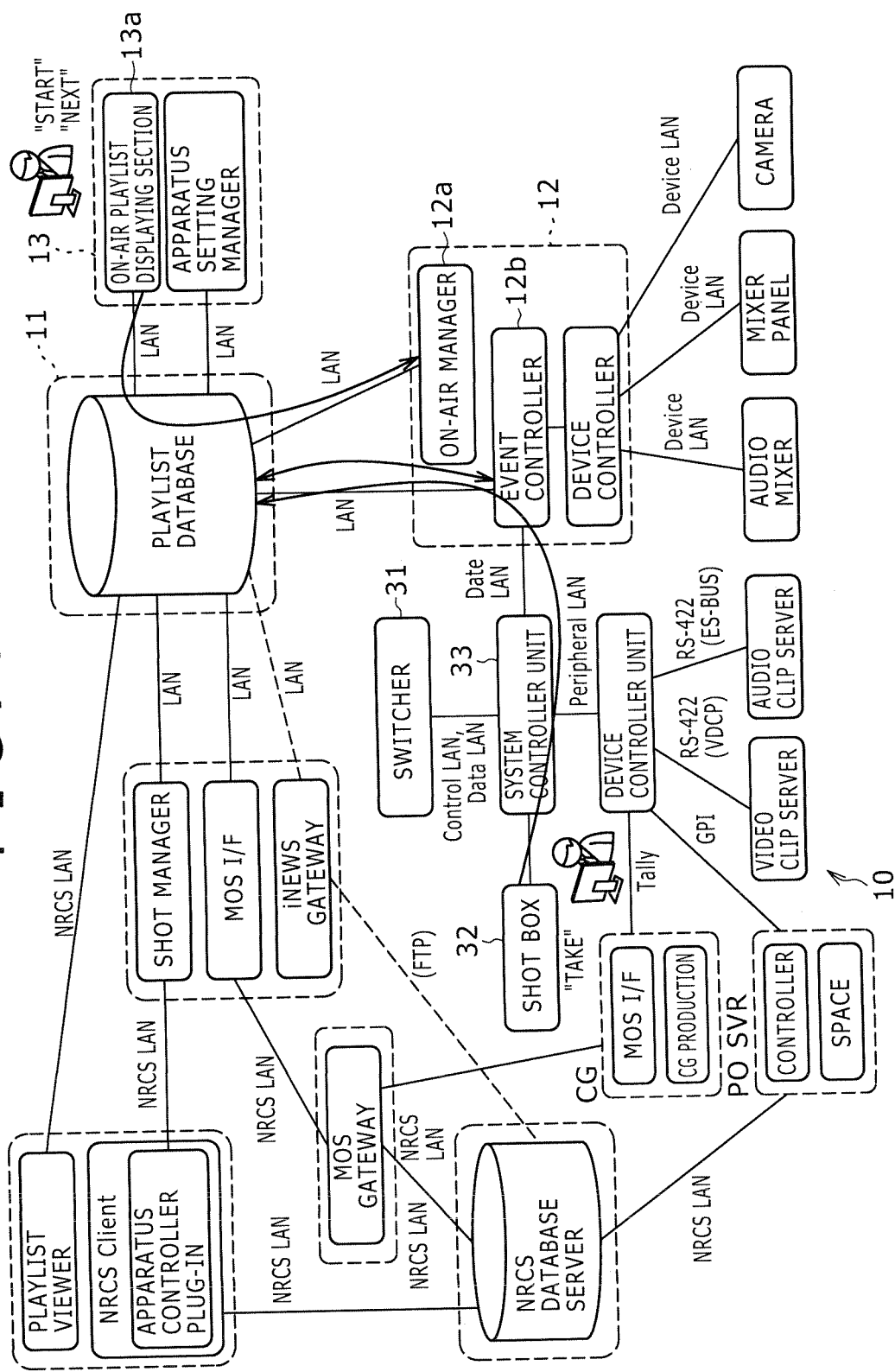
FIG. 4 is a similar view but illustrating an example of program sending operation of the program sending controlling apparatus of FIG. 1.

FIG. 4 illustrates an example of program sending operation.

First, the playlist displaying section 13 starts up the on-air playlist displaying section 13a in response to an operation of the operator, and reads out a playlist of a program of an object of sending from the playlist database 11 and displays the playlist on the screen. If the operator of the playlist displaying section 13 inputs a command to start the playlist displayed on the screen, then this command is notified to the on-air manager 12a of the apparatus controller 12 through the playlist database 11.

In response to reception of the command by the on-air manager 12a, the event controller 12b reads out the playlist of the program of the sending object from the playlist database 11 and controls those broadcasting-related apparatus which are required in a cue of the playlist.

Further, if the operator inputs the TAKE command on the shot box 32 on the switcher 31 side, then the event controller 12b of the apparatus controller 12 reads out information of a next cue of the playlist from the playlist database 11. Then, the event controller 12b controls those broadcasting-related apparatus which are required as described in the read out cue. The sequence of operations is successively repeated along the permutation of the cues of the playlist to send out the contents of the program in the order of the cues of the playlist. It is to be noted that the event controller 12b carries out not only the control regarding the taken cue, that is, the cue placed into the on-air state, but also control of those broadcasting-related apparatus which relate to a cue which is scheduled to be placed into an on-air state subsequently. For example, the event controller 12b issues an instruction for preparations to output a material from various servers or a VTR. Or, for example, the event controller 12b issues an instruction to a robot camera to be directed in a designated image pickup direction so that the robot camera may be directed to the image pickup direction before the cue is taken.

2. Example of Display of a Playlist

Example of Entire Display of Playlist

Figure 5:
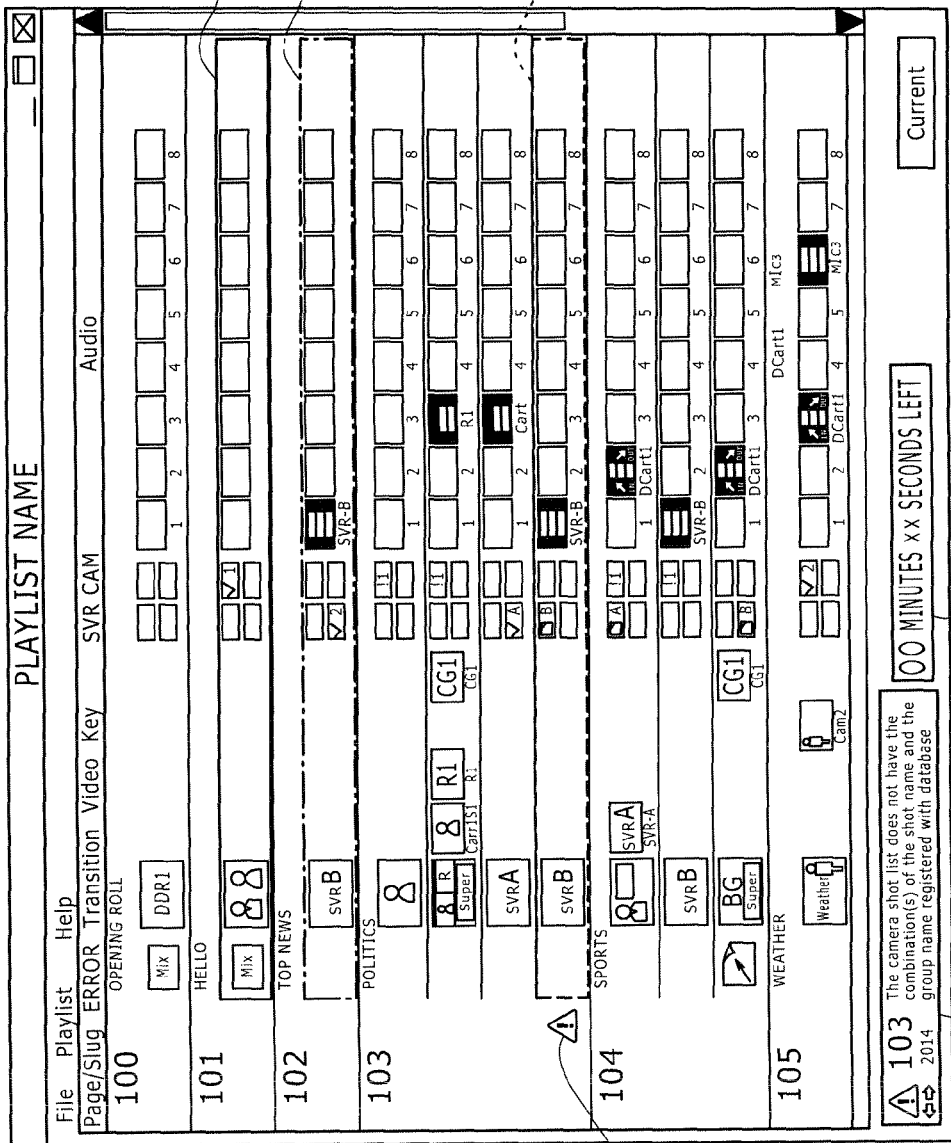
FIG. 5 is a schematic view showing an example of a display screen image of an entire playlist.

FIG. 5 shows an example of display when a produced playlist is displayed on the screen image by the on-air playlist displaying section 13a.

In the playlist during on-air, each line corresponds to one cue, and the contents of the cues which configure the playlist are successively executed in a downward direction from the top in accordance with an instruction of the operator or in accordance with lapse of time to broadcast the program.

The cues are registered in an associated relationship with events which configure the program. A number is applied to each event, and a cue is applied corresponding to the number. In the example illustrated in FIG. 5, event numbers are applied in the order of 100, 101, 102, . . . , and cues are allocated to the individual events. Since the display region is limited from a restriction in size of the screen, those evens and cues which are not displayed come to be displayed by operating a scroll bar.

One or more cues are allocated to one event. A title is applied to each event, and the contents of the cue or cues are displayed as a pattern. The contents of the cues are "Page/Slug," "ERROR," "Transition," "Video," "Key," "SVR," "CAM" and "Audio." "Page/Slug" is a column for indicating a configuration number and a configuration name. "ERROR" is a column for indicating an error indication hereinafter described. "Transition" is a column for indicating a type of transition of the screen image. "Video" is a column for indicating a setting of an image to be sent out. "Key" is a column for indicating a setting of an image to be superposed, which is set by the switcher 31. "SVR" is a column for indicating a status of the playout server m5, and the status is acquired from the NRCS side and displayed. "CAM" is a column for indicating a status of the camera m3. "Audio" is a column for indicting a setting of a material, a level and so forth for each channel of sound.

In playlist display during on-air, a cue which currently is an on-air object is colored so that the cue of the on-air object can be visually observed clearly. Further, another color is applied to a cue next to the cue which currently is an on-air object so that it can be visually observed clearly that the cue is to be placed into an on-air state subsequently. Since control for preparations for material outputting is sometimes carried out for various apparatus with regard to the cue to be subsequently placed into an on-air state, there is a significance in that the cue is clearly indicated by the different color or the like. It is to be noted that, as the method of displaying a cue of an on-air object, that is, an item during broadcasting, such a character string as "ON Air," "During broadcast" or "During sending out" may be displayed or a different pattern may be displayed.

Example of Error Indication

The display of each cue of the playlist includes a column of "ERROR." In the column of "ERROR," an error indication EM is displayed. In particular, if the event controller 12b adds error information to a playlist, then the on-air playlist displaying section 13a which reads in the playlist displays the error indication EM in the column of "ERROR" of the cue corresponding to the added error information.

Also when a syntax error is detected in the playlist during on-air, the on-air playlist displaying section 13a displays the error indication EM in the column of "ERROR" of the corresponding cue.

Figure 6:
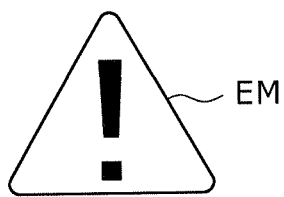
FIG. 6 is a schematic view showing an example of an error indication.

FIG. 6 illustrates an example of the error indication. The error indication EM is represented by a pattern for indicating presence of an error. For example, the error indication EM may have a pattern from which it can be visually confirmed readily such as a pattern of a yellow triangle in which an exclamation mark is placed as seen in FIG. 6.

It is to be noted that, depending upon whether an error occurs with some broadcasting-related apparatus or a syntax error occurs with a playlist, different error indications may be used for distinction of such errors. This makes it possible for the operator to quickly decide whether the broadcasting-related apparatus should be checked or the playlist should be corrected.

In the example shown in FIG. 5, the error indication EM is indicated in the column of "ERROR" of the lowermost cue from within the configuration of the number 103. If the operator refers to the screen display of the playlist and adjusts the selection framework W to the cue with regard to which the error indication EM is displayed in the column of "ERROR" or adjusts the selection framework W to the cue and issues an instruction such as click of the mouse button, then detailed contents of the error can be displayed.

Particular contents of the occurring error are displayed, for example, in the column of the error monitor EMT at a lower portion of the display region. In the column of the error monitor EMT, a number of a configuration of the cue with regard to which the error occurs, an error number and particular contents of the error are indicated by characters. The operator would refer to the contents of the error monitor EMT to grasp from what trouble a broadcasting-related apparatus which is required in a cue which subsequently becomes an object of broadcasting suffers. Consequently, an appropriate countermeasure can be taken before broadcasting for the broadcasting-related apparatus from which the trouble is detected.

Syntax Error Display Process

Figure 7:
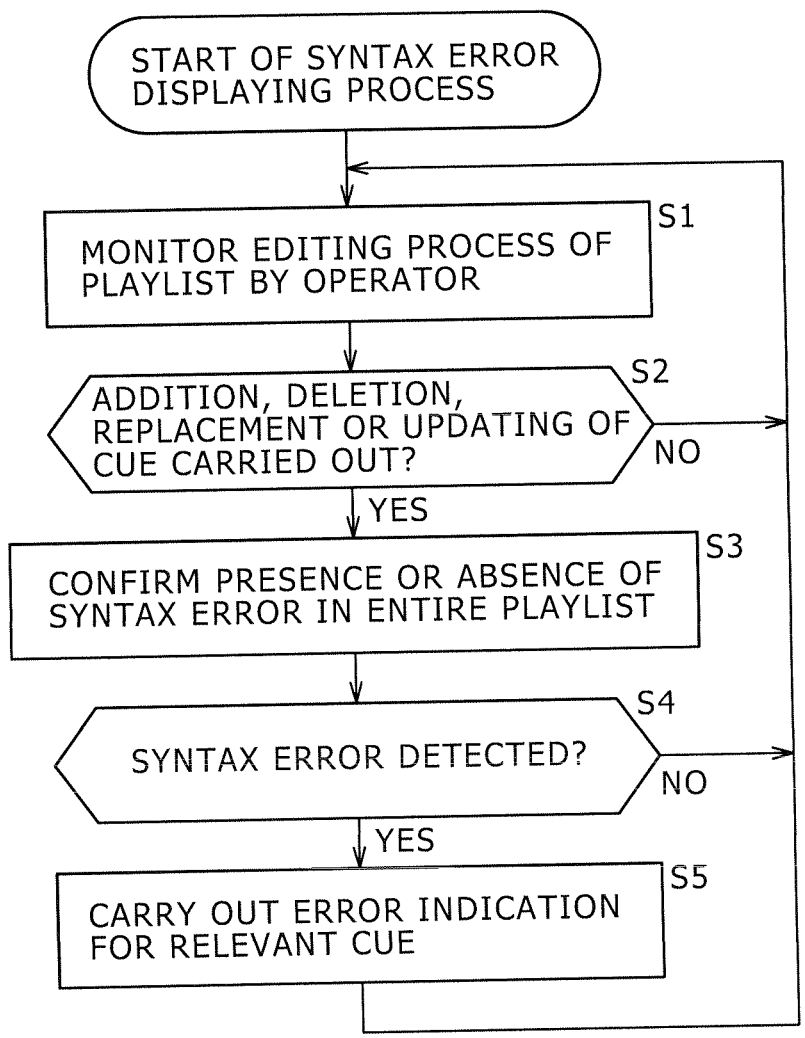
FIG. 7 is a flow chart illustrating a syntax error displaying process.

FIG. 7 is a flow chart illustrating a syntax error displaying process.

The syntax error displaying process may be executed continuously, for example, while a playlist during on-air is displayed on the screen of the monitor by the on-air playlist displaying section 13a. Or the syntax error displaying process may be executed during new production or editing of a playlist.

Referring to FIG. 7, first at step S1, the on-air playlist displaying section 13a monitors editing of that one of playlists registered in the playlist database 11 which corresponds to a program during on-air. In other words, the on-air playlist displaying section 13a supervises that the playlist corresponding to the program during on-air is edited by the operator through the NRCS client 22.

Then at step S2, the on-air playlist displaying section 13a decides whether or not editing such as addition, deletion, replacement, order change or updating of a cue is carried out for the playlist corresponding to the program during on-air. Then, if it is decided that editing is carried out for the playlist corresponding to the program during on-air, then the processing is advanced to step S3. On the other hand, if it is decided that editing of the playlist is not carried out, then the processing is returned to step S1 so that the processes at the steps beginning with step S1 are repeated.

At step S3, the on-air playlist displaying section 13a confirms presence or absence of a syntax error in the entire playlist corresponding to the program during on-air.

Here, a syntax error in a playlist is described. A syntax error in a playlist may be a syntax error of a sole cue or a syntax error between different cues.

Examples of a syntax error of a sole cue are indicated below:
1. State in which a broadcasting-related apparatus set so as to be used in a cue does not exist
2. State in which a material such as video data or audio data set so as to be used in a cue does not exist
3. Such setting in a cue that a broadcasting-related apparatus is used with a capacity higher than that which the broadcasting-related apparatus has For example, a setting that the same m3 picks up an image simultaneously in two directions; a setting that the playout server m5 outputs two different video materials at the same time; a setting that, upon synthesis of videos by the switcher 31, a number of videos greater than the number of channels which can be synthesized by the switcher 31 are synthesized; a setting that a number of video signals greater than the number of video signal generators existing in the switcher 31 are generated in the inside of the switcher 31; and so forth
4. Duration error in a cue For example, a case in which transition from a certain cue or preceding cue to a next cue by fade, wipe or the like is designated and the transition time required for the transistor is longer than a period of time which is given to the preceding cue Examples of a syntax error between cues are indicated below:
1. Setting in successive cues that the same camera m3 picks up an image in different directions (since movement of the image pickup direction is not carried out in a moment, an image during movement is adopted)
2. Setting in successive cues that different video materials are outputted from the same output channel of the playout server m5 (although depending upon the performance of the playout server m5, there is the possibility that an image may exhibit a black out state upon changeover of a channel or upon changeover of a file to be reproduced)
3. Setting in successive cues that the same VTR (not shown) is used (exchange of a tape cassette and fast feeding and rewinding of the tape position cannot be carried out in a moment)
4. Setting in successive cues that the same video clip server m6 is used (although depending upon the performance of the video clip server m6, there is the possibility that, upon changeover of a video file to be reproduced, an image may exhibit a black out)
5: Setting in successive cues that the same audio clip server m7 is used (although depending upon the performance of the audio clip server m7, there is the possibility that, upon changeover of an audio file, sound may be interrupted)

Referring back to FIG. 7, after the presence or absence of a syntax error described above is confirmed, the on-air playlist displaying section 13a decides at step S4 whether or not a syntax error is detected in the playlist corresponding to the program during on-air. If it is decided that a syntax error is detected, then the processing advances to step S5. On the contrary if it is decided that a syntax error is not detected, then the processing returns to step S1 so that the processes at the steps beginning with step S1 are repeated.

At step S5, the playlist displaying section 13 causes the error indication EM to be displayed in the column of "ERROR" of the cue with regard to which a syntax error is detected. Further, the information of the error is stored into the playlist database 11. The playlist database 11 notifies, if there exists an apparatus which displays the same playlist in addition to the on-air playlist displaying section 13a, the apparatus of the stored information of the error. Thereafter, the processing returns to step S1 so that the processes at the steps beginning with step S1 are repeated. The description of the syntax error displaying process ends therewith.

Since the playlist described is used for on-air, redoing cannot be carried out if broadcasting utilization of the program is started once. Disorder of the picture during on-air gives rise to vast economical loss. Therefore, a problem which may possibly occur between successive cues or a like problem is an object to be detected. Such a characteristic of the apparatus of the present invention can be applied not only to an apparatus for on-air but also a video editing apparatus or system wherein editing is progressed in synchronism with the timing of the video.

With the syntax error displaying process described above, also when a playlist corresponding to a program during on-air is edited, a problem or syntax error caused by the editing can be let known to the operator. Consequently, the operator can correct the playlist before a problem occurs.

Since editing of a playlist can be carried out by such a method that an operator moves a software button on a GUI (Graphical User Interface), such a situation that a syntax error is caused by an operation without sufficiently confirming contents can likely to occur. Therefore, notification by the present invention is effective.

It is to be noted that detection of a syntax error and error indication based on the detection may be executed not only for a playlist during on-air but also for a new playlist during production or for a playlist during editing in a state in which it is not in an on-air state. In this instance, such processes may be executed by the playlist viewer 22a of the NRCS client 22.

It is to be noted that, although the examples of a syntax error between cues described above relate to successive cues, an error arising from a period of time required for preparations of the apparatus may be detected between those cues which are not successive cues but are near to each other in time upon on-air.

Incidentally, while the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

Figure 8:
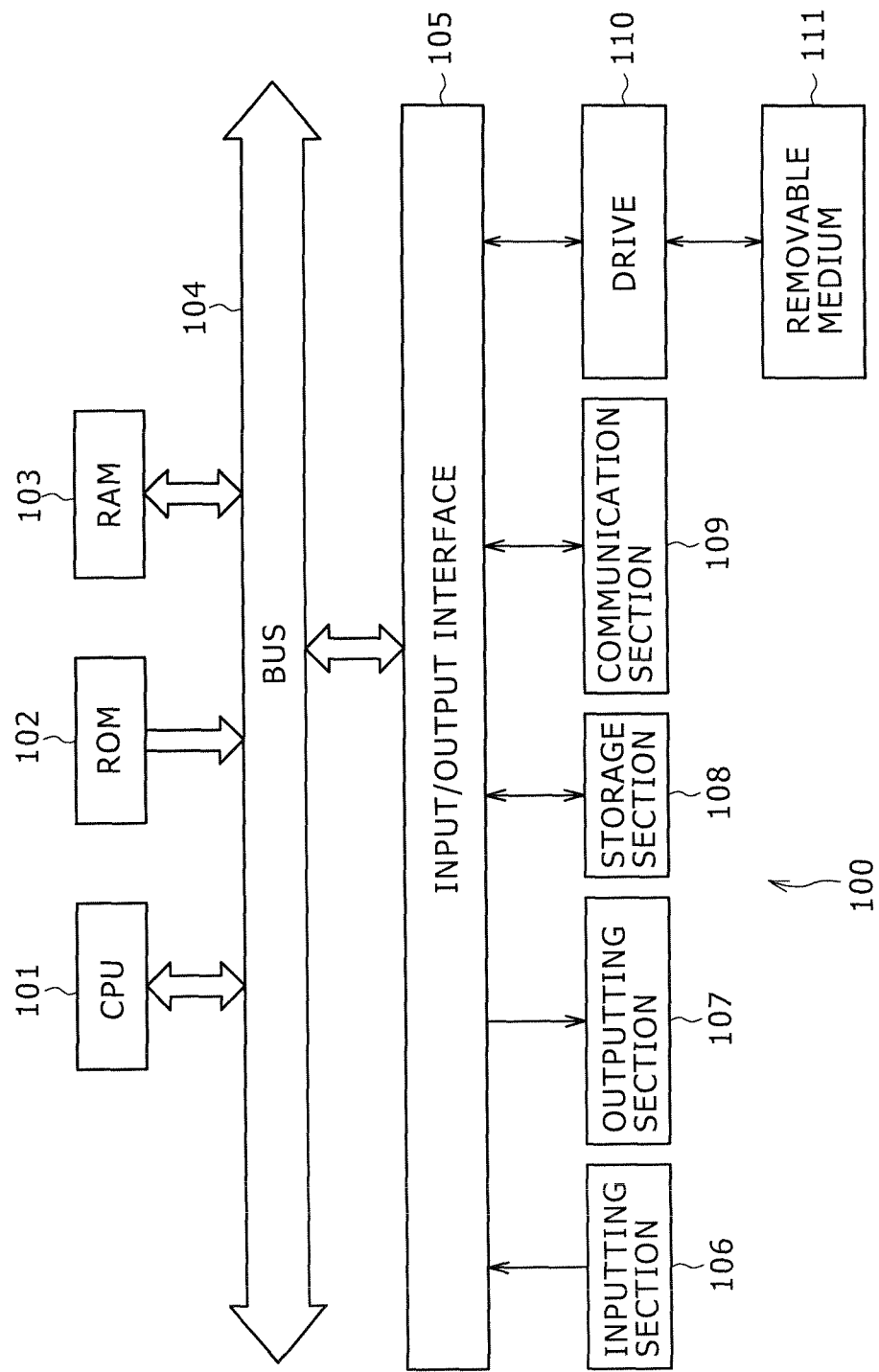
FIG. 8 is a block diagram showing an example of a configuration of a computer.

FIG. 8 shows an example of a hardware configuration of a computer which executes the series of processes described hereinabove in accordance with a program.

Referring to FIG. 8, the personal computer 100 shown includes a central processing unit (CPU) 101, a read only memory (ROM) 102 and a random access memory (RAM) 103 connected to each other by a bus 104.

Further, an input/output interface 105 is connected to the bus 104. To the input/output interface 105, an inputting section 106 including a keyboard, a mouse, a microphone and so forth, an outputting section 107 including a display unit, a speaker and so forth, and a storage section 108 including a hard disk, a nonvolatile memory or the like are connected. Also a communication section 109 including a network interface and so forth and a drive 110 for driving a removable medium 111 such as a magnetic disk, an optical disk, a magneto-optical disk or a semiconductor memory are connected to the input/output interface 105.

In the computer 100 configured in such a manner as described above, the CPU 101 loads a program, for example, stored in the storage section 108 into the RAM 103 through the input/output interface 105 and the bus 104 and then executes the program to carry out the series of processes described above.

It is to be noted that the program executed by the computer may define processes which are carried out in a time series in the order as described herein or may define processes which are carried out in parallel or at necessary timings such as when they are called.

Further, the program may be processed by a single computer or may be processed discretely by a plurality of computers. Further, the program may be transferred to and executed by a computer at a remote place.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-089030 filed with the Japan Patent Office on Apr. 7, 2010, the entire content of which is hereby incorporated by reference.

What is claimed is:

1. A program sending controlling apparatus, comprising:
one or more processors operable to:
retain a playlist comprising cues, wherein the cues are progressing units of a program disposed in a time series;
control on-air of a broadcasting-related apparatus based on the playlist;
edit the playlist;
detect, in response to editing carried out for the playlist corresponding to the program, presence or absence of a syntax error in the playlist;
display the playlist corresponding to the program; and
display, when the syntax error is detected, an error indication at a position of that one of the cues of the displayed playlist which corresponds to the detected syntax error, wherein the one or more processors detect, in response to editing carried out for the playlist corresponding to the program, the syntax error in a sole cue in the playlist or the syntax error between successive one of the cues,
wherein the one or more processors detect, as the syntax error between the successive cues, that the same broadcasting-related apparatus is used in the successive cues.

2. The program sending controlling apparatus according to claim 1, wherein the editing of the playlist corresponding to the program includes at least one of addition, deletion, replacement, or updating of the cue.

3. The program sending controlling apparatus according to claim 1, wherein the one or more processors detect, as the syntax error between the successive cues, that the same output channel of the same broadcasting-related apparatus is used in the successive cues.

4. The program sending controlling apparatus according to claim 1, wherein the one or more processors detect, as the syntax error in the sole cue, that a period of time of the sole cue is shorter than a transition time period required for transition to a next cue.

5. The program sending controlling apparatus according to claim 1, wherein the one or more processors detect presence or absence of the syntax error with regard to the playlist in response to the editing carried out for the playlist corresponding to the program.

6. The program sending controlling apparatus according to claim 1, wherein the one or more processors are operable to:
detect an error occurring with the broadcasting-related apparatus,
display an error indication corresponding to the detected syntax error and an error indication corresponding to the detected error occurring with the broadcasting-related apparatus in a distinguishable manner from each other at a corresponding position of the cue of the playlist.

7. A program sending controlling method, comprising:
retaining a playlist comprising cues, wherein the cues are progressing units of a program disposed in a time series;
controlling on-air of a broadcasting-related apparatus based on the playlist;
editing the playlist;
detecting, in response to editing carried out for the playlist corresponding to the program, presence or absence of a syntax error in the playlist;
displaying the playlist corresponding to the program; and
displaying, when the syntax error is detected, an error indication at a position of that one of the cues of the displayed playlist which corresponds to the detected syntax error, wherein the syntax error between successive one of the cues is detected when the same broadcasting-related apparatus is used in the successive cues.

8. A non-transitory computer-readable storage medium having stored thereon, a computer program having at least one code section for broadcasting, the at least one code section being executable by a device for causing the device to perform steps comprising:
retaining a playlist comprising cues, wherein the cues are progressing units of a program disposed in a time series;
controlling on-air of a broadcasting-related apparatus based on the playlist;
editing the playlist;
detecting, in response to editing carried out for the playlist corresponding to the program, presence or absence of a syntax error in the playlist;
displaying the playlist corresponding to the program; and
displaying, when the syntax error is detected, an error indication at a position of that one of the cues of the displayed playlist which corresponds to the detected syntax error, wherein the syntax error between successive cues is detected when the same broadcasting-related apparatus is used in the successive cues.

9. A program sending controlling apparatus, comprising:
one or more processors operable to:
retain a playlist comprising cues, wherein the cues are progressing units of a program disposed in a time series;

control on-air of a broadcasting-related apparatus based on the playlist;

edit the playlist;

detect, in response to editing carried out for the playlist corresponding to the program, presence or absence of a syntax error in the playlist;

display the playlist corresponding to the program; and display, when the syntax error is detected, an error indication at a position of that one of the cues of the displayed playlist which corresponds to the detected syntax error, wherein the syntax error between successive cues is detected when the same output channel of the same broadcasting-related apparatus is used in the successive cues.

10. The program sending controlling apparatus according to claim 9, wherein the editing of the playlist corresponding to the program comprises at least one of addition, deletion, replacement or updating of the cue.

11. The program sending controlling apparatus according to claim 9, wherein the one or more processors detect the syntax error between successive cues when the same broadcasting-related apparatus is used in the successive cues.

12. The program sending controlling apparatus according to claim 9, wherein the one or more processors detect the syntax error in the sole cue when a period of time of the sole cue is shorter than a transition time period required for transition to a next cue.

13. The program sending controlling method according to claim 7, wherein the editing of the playlist corresponding to the program comprises at least one of addition, deletion, replacement, or updating of the cue.

14. The program sending controlling method according to claim 7, wherein the syntax error between the successive cues is detected when the same output channel of the same broadcasting-related apparatus is used in the successive cues.

15. The program sending controlling method according to claim 7, wherein the syntax error in the sole cue is detected when a period of time of the sole cue is shorter than a transition time period required for transition to a next cue.

16. The non-transitory computer-readable storage medium according to claim 8, wherein the editing of the playlist corresponding to the program comprises at least one of addition, deletion, replacement, or updating of the cue.

17. The non-transitory computer-readable storage medium according to claim 8, wherein the syntax error between successive cues is detected when the same output channel of the same broadcasting-related apparatus is used in the successive cues.

18. The non-transitory computer-readable storage medium according to claim 8, wherein the syntax error in the sole cue is detected when a period of time of the sole cue is shorter than a transition time period required for transition to a next cue.

* * * * *